Nov. 24, 1931.  T. C. PROUTY  1,833,497
DRYING APPARATUS
Filed June 27, 1927  3 Sheets-Sheet 1

INVENTOR.
Theodore C. Prouty
BY
Walter Scott
ATTORNEY.

Nov. 24, 1931.  T. C. PROUTY  1,833,497
DRYING APPARATUS
Filed June 27, 1927   3 Sheets-Sheet 2
Fig.6.
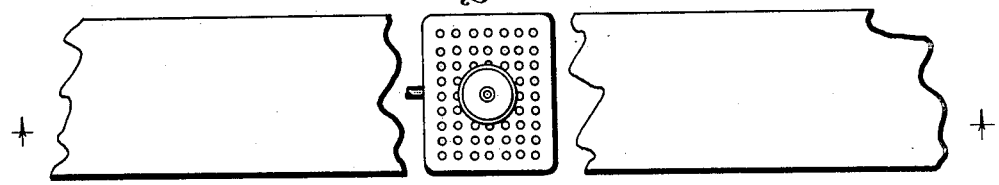
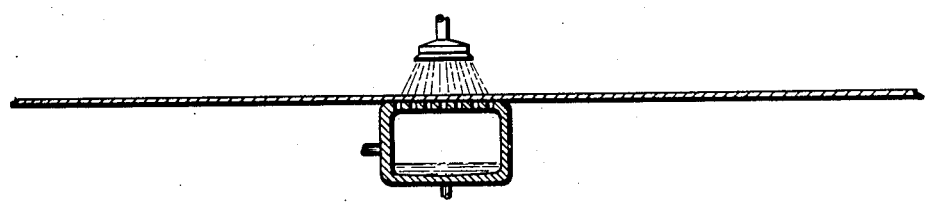
Fig.5.
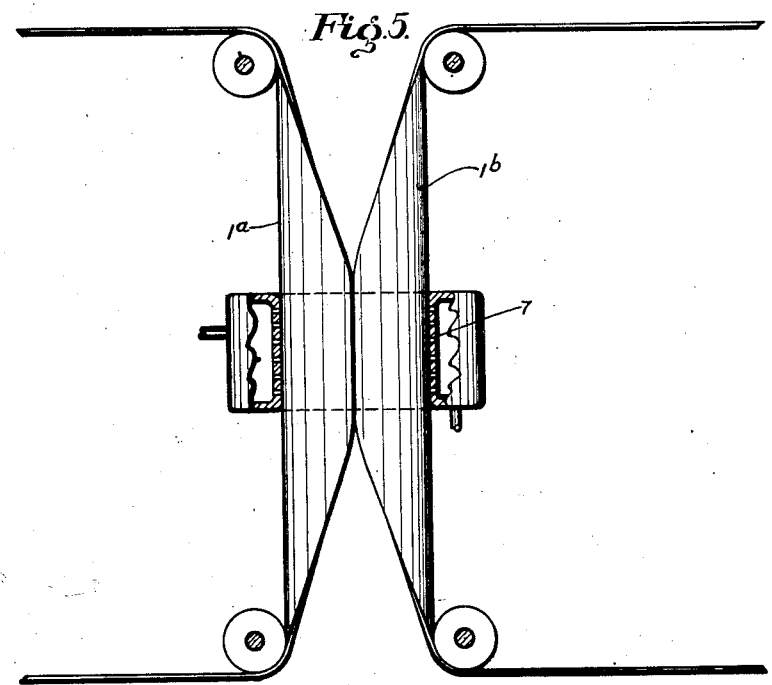
INVENTOR.
Theodore C. Prouty
BY
ATTORNEY.

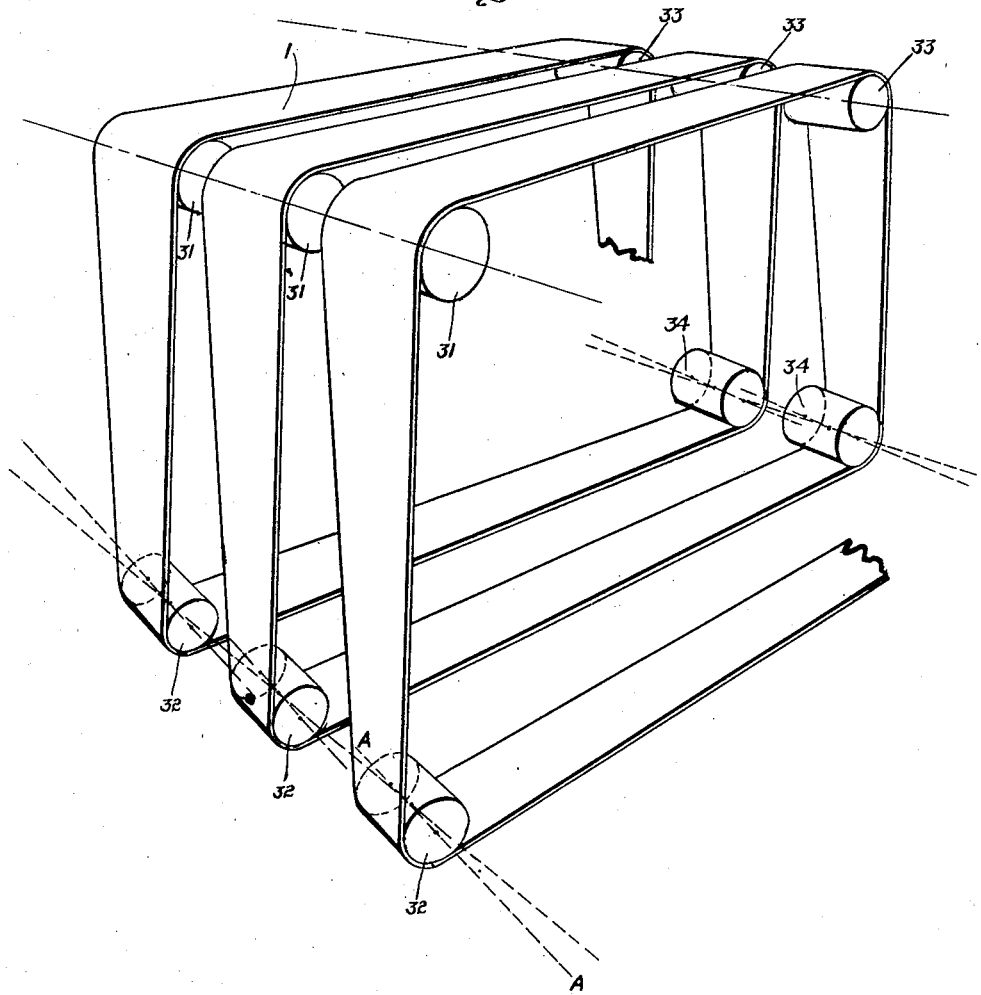

Patented Nov. 24, 1931

1,833,497

UNITED STATES PATENT OFFICE

THEODORE C. PROUTY, OF HERMOSA BEACH, CALIFORNIA; WILLIS O. PROUTY ADMINISTRATOR OF SAID THEODORE C. PROUTY, DECEASED

DRYING APPARATUS

Application filed June 27, 1927. Serial No. 201,808.

The purpose of my invention is to provide means for rapidly drying solids suspended in or otherwise mixed with liquids, and is particularly applicable to mixtures of finely ground mineral with water such as are used in certain stages of the manufacture of ceramics. In filtration processes it is common practice to de-water mixtures, such as ore pulps, by bringing the mixture into contact with the surface of a porous medium, such as a woven fabric, on the opposite side of which a partial vacuum is maintained, the effect being to draw the water or other liquid to the low pressure side of the fabric and cause the solids to adhere in a compact layer or coating to the opposite side. While such a process effectually removes the excess water, it leaves the finely divided solids in admixture with a relatively high percentage of liquid. My invention relates more particularly to the removal of that part of the water which cannot be separated from the solids by the means described. I have found that if a suspension of finely divided solids in water or other liquid, be projected at high velocity against a porous medium, such as a woven fabric belt, the force of impact causes a large proportion of the solids to adhere to the porous medium, part of the liquid passing thru the porous medium and part rebounding with its solid content greatly reduced. By forcibly projecting the mixture of solids and liquid against one side of a porous fabric or other medium and maintaining reduced pressure on the opposite side there is caused a very rapid deposition of the solids on the porous medium in the form of an adherent layer containing a very low percentage of liquid, so low a percentage that by a relatively rapid passage of the porous medium through a heated chamber, the moisture remaining with the solids can be diminished to practically any extent necessary.

In the drawings:

Figure 4 is a diagrammatic view showing the manner of conducting the separator belt through the heating chamber.

Figure 5 shows a modification of the construction shown in Figure 1, the porous separator medium comprising two belts instead of a single belt.

Figure 6 is a fragmentary view showing a different form of vacuum element and a flat separator belt.

Figure 1:
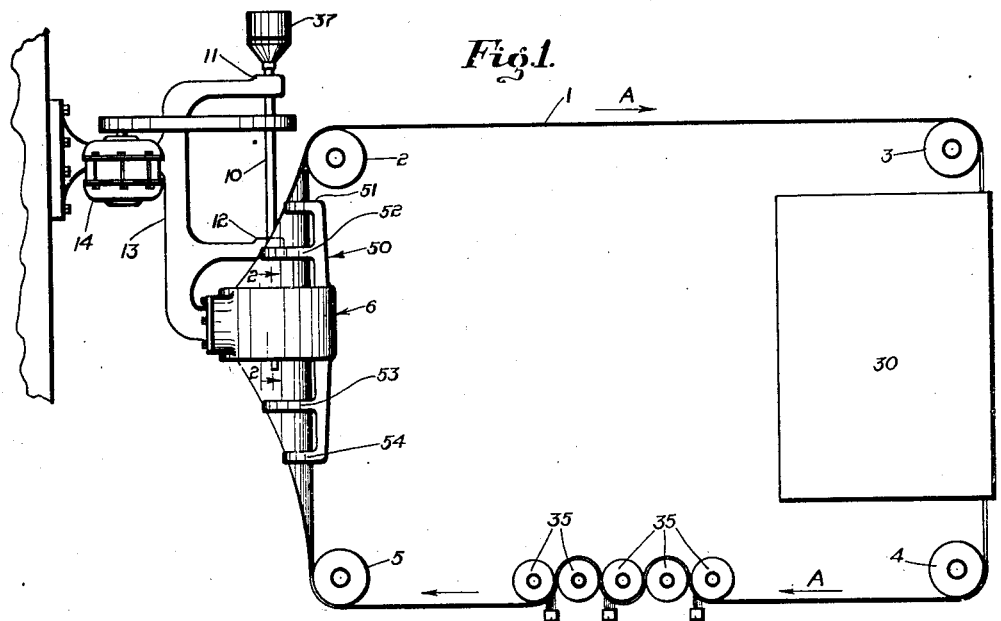
Figure 1 is an elevation view, partly diagrammatic, of apparatus constructed and to be operated in accordance with my invention.

The endless separator belt 1 preferably consists of woven fabric passing over guide rollers 2, 3, 4 and 5, one or more of which may be power-driven to move the belt longitudinally in the direction indicated by the arrows A, A. The means for subjecting one side of the belt to reduced pressure is indicated generally by the numeral 6 and comprises an annulus 7 in the form of a perforated cylindrical wall which, in the construction shown, forms the inner wall of a chamber provided with a connection 8 to an exhaust pump and with a drain opening 9.

The belt after passing over the roller 5 passes through guides which gradually bend its edges toward its longitudinal center causing the belt to assume a cylindrical form upon an axis parallel to its length.

In Figure 1 I have shown a guide 50 for the purpose, supported upon the structure of the vacuum chamber 6. The arms 51 of the guide have a relatively slight curvature and the arms 52 have a greater curvature thereby gradually bringing the belt to a cylindrical form. The arms 53 and 54 are of a form similar respectively to arms 52 and 51 and serve to restrain the belt against flattening too abruptly after leaving the annulus.

In the cylindrical form so imparted to the belt it passes through the perforated annulus 7 and then again flattens out and passes over the roller 2. The external diameter of the cylindrical part of the belt being substantially equal to the internal diameter of the annulus 7, the difference in pressure on the opposite sides of the belt as it passes through the annulus will hold its outer surface smoothly against the interior of the annulus.

Extending axially of the annulus and of the cylindrical section of the belt is a tubular shaft 10 supported in bearings 11, 12 on a bracket, 13. The bracket 13 preferably also supports the reduced pressure chamber 6 and a motor 14 which is belted to the shaft 10 as shown. At a point inside the annulus 7 the shaft 10 carries a centrifugal nozzle designated generally by the numeral 15.

The nozzle 15 as illustrated comprises two disc-shaped metal casing members 16, 17 provided with circumferential flanges 18, 19 which are directed toward each other but with an intervening space 20. The disc 16 has an upwardly projecting boss 21 which surrounds and is seated against a shoulder 22 on the shaft 10. In order to protect the metal casing members 16, 17 from the abrasive action of the material treated in the apparatus each of said members is provided with a ceramic lining preferably vitrified throughout or on the exposed surfaces thereof. These linings, shown at 23, 24 conform to the inner shape of the casing members 16 and 17 and have circumferential flanges 25, 26 which extend toward and meet each other and are of such depth that when brought together the flanges 18, 19 of the metal casing members are held apart and separated by the intervening space 20. A bolt 27 threaded into the shaft 10 serves to hold the casing and lining members of the centrifugal nozzle to the end of the tubular shaft in the assembled position shown. The bolt is provided with an axial duct 40 communicating with the interior of the tubular shaft 10 and with a cross duct connecting duct 40 with the chamber in the centrifugal nozzle 15.

Figure 2:
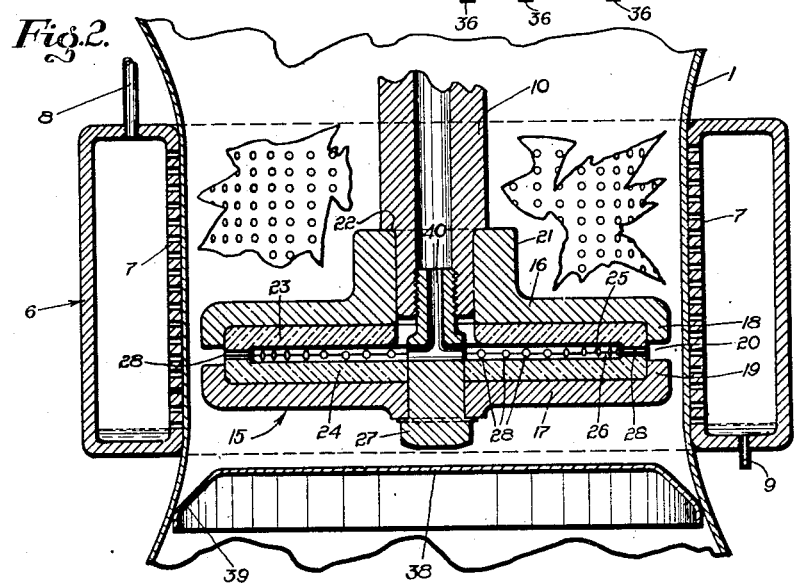
Figure 2 is a sectional view with certain parts broken away to exhibit the part of the apparatus in which the separation by the joint action of impact and reduced pressure takes place.
Figure 3:
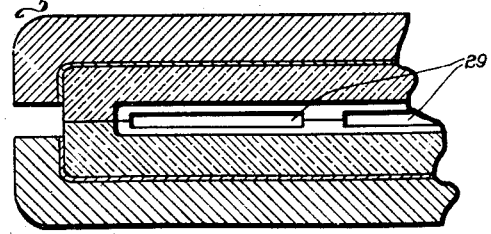
Figure 3 is a sectional view of a modification of part of the structure shown in Figure 2.

At the meeting edges of the lining members 23, 24 a circumferential series of openings 28 is formed as shown in Figure 2. These openings may be circular in cross-section as indicated at 28, Figure 2, or may be in the form of elongated slits as shown at 29 in Figure 3.

In Figures 5 I have shown two separator belts 1ª, 1ᵇ, each extending around one half of the circumference of the perforated annulus 7 instead of a single belt extending around the entire circumference as in Figures 1 and 2.

The separator belt with the layer of solids thereon passes through the heating chamber 30 to which heat may be supplied by any suitable means. The belt may be directed through several convolutions inside of the heating chamber to prolong the time of application of heat thereto.

In Figure 4 I have shown diagrammatically a series of rollers adapted to guide the belt through several convolutions with the rollers contacting only with the side of the belt opposite that on which the solids are deposited. The rollers 31 have their axes in alinement and the axes of the rollers 33 are in alinement and parallel to the axes of the rollers 31. The rollers 32 and 34 are so disposed in relation to the rollers 31 and 33 as to impart substantially rectangular turns to the separator belt as it passes through the heater. The axes of the rollers 32, 32, 32 and 34, 34 are parallel to each other but at a sufficient angle to the axes of the rollers 31, 33 to guide the belt in a helical path, the angularity referred to being indicated by the dotted lines shown in connection with the rollers 32, 34 in Figure 4. Any of the solids that become separated from the belt in the heater 30 may be there collected.

For the complete separation of the dried solids from the belt I provide a series of rollers 35, in passing over which the belt is alternately bent in opposite directions and at the same time preferably subjected to the action of brushes or scrapers 36.

The form of the apparatus above described in which the vacuum separating element is in annular form with the separating belt passing therethrough in cylindrical form renders the use of a centrifugal projecting nozzle practical, the nozzle being within the cylindrical section of the belt all of the material projected therefrom is deposited on the belt.

In Figure 2 I have shown a circular plate 38 having a flange 39 that contacts circumferentially with the inner surface of the belt 1 just before it enters the annulus 7. Material rebounding from or running down the belt 1 will be deposited on the plate 38 and returned to the inner face of the belt. Any material escaping past the plate 38 may be collected and returned to the original feed of the apparatus or may be otherwise treated.

The broad principle of my invention, however, may be applied with apparatus of other forms, such as a pressure nozzle, and with the perforated vacuum separating element in the form of a flat plate as shown in Figure 6.

The extent of the area of the belt that is subjected to the action of the vacuum element and of the area over which the material is deposited on the belt may be varied to suit the requirements of the material being treated and the extent to which it is to be dried.

The centrifugal form of apparatus herein described is well adapted to the treatment of abrasive solids as the pressure necessary for forcibly projecting the material against the belt is obtained without the use of pumps or other apparatus that would be subject to rapid deterioration by the abrasive action of the substance being treated. The centrifugal nozzle has an additional advantage in that its use renders it possible to deliver the material at a much higher pressure than could be attained by other means operating upon a mixture of the kind for which my invention is designed. Without pressure upon the material, as in the operation of the commonly used vacuum filters, the difference in pressure upon opposite sides of the porous filter medium cannot exceed the pressure of the atmosphere, and with pumps it is impractical to build up a pressure in excess of about two hundred pounds to the square inch, but by centrifugal means, such as described herein, the material can be subjected to and delivered at a much higher pressure.

I claim:

1. In combination, a porous belt, a perforated annulus, means for maintaining sub-atmospheric pressure upon the outer side of said annulus, means for moving said belt longitudinally through said annulus with one side in contact with the inner surface thereof, and means for projecting material by centrifugal force against said belt.

2. In combination, a porous belt, a perforated annulus, means for maintaining sub-atmospheric pressure upon the outer side of said annulus, means for moving said belt longitudinally through said annulus with one side in contact with the inner surface thereof, a rotatable shaft substantially concentric with said annulus, a centrifugal nozzle fixed to said shaft, said nozzle comprising a metal casing formed in two parts separated on a plane transverse of its axis and a vitreous lining member in each of said parts, outlet apertures being provided at the meeting edges of the two parts of said nozzle.

3. In combination, a porous belt, means for moving said belt longitudinally, means for maintaining sub-atmospheric pressure upon one side of said belt and means for forcibly projecting material to be dried against the opposite side thereof and opposite the zone of impact of the projected material, and means for applying heat to said belt and to the material adhering thereto.

4. In combination, a porous belt, means for moving said belt longitudinally, means for maintaining sub-atmospheric pressure upon one side of said belt and means for forcibly projecting material to be dried against the opposite side thereof, and means for applying heat to said belt and to the material adhering thereto, said last named means comprising a chamber and means in said chamber to guide said belt in a helical course.

5. In combination, a porous belt, means for moving said belt longitudinally, means for maintaining sub-atmospheric pressure upon one side of said belt and means for forcibly projecting material to be dried against the opposite side thereof, and means for applying heat to said belt and to the material adhering thereto, said last named means comprising a chamber and a series of pulleys therein having their axes angularly disposed to guide said belt in a helical course.

In testimony whereof, I have subscribed my name.

THEODORE C. PROUTY.